United States Patent [19]

Cuykendall et al.

[11] Patent Number: 4,926,366

[45] Date of Patent: May 15, 1990

[54] THIN FILM OPTICAL COMPUTING

[75] Inventors: Robert R. Cuykendall; Karlheinz Strobl, both of Iowa City, Iowa

[73] Assignee: University of Iowa Research Foundation, Iowa City, Iowa

[21] Appl. No.: 341,697

[22] Filed: Apr. 21, 1989

[51] Int. Cl.[5] .................................................. G06F 7/56

[52] U.S. Cl. .................................................. 364/713

[58] Field of Search ................ 364/713, 807, 822, 837

[56] References Cited

U.S. PATENT DOCUMENTS 4,811,258 3/1989 Andersen et al. .................. 364/713

*Primary Examiner*—Gary V. Harkcom

*Assistant Examiner*—Tan V. Mai

*Attorney, Agent, or Firm*—Henderson & Sturm

[57] ABSTRACT

An optical integration technique using thin film technology is based on a nonlinear interface with a diffusive or saturated Kerr-like nonlinearity. Solid state multiplexing is implemented with thin film multilayer stacks resulting in polarizers and phase retarders matched to the interface. The simplicity of the integration architecture is demonstrated by designing a thin film half-adder, a full adder and a carry-propagate adder.

40 Claims, 12 Drawing Sheets

MODULAR INTERACTION GATE MATERIAL SELECTION TABLE

| 1st. MAT'L | 2nd. & 3rd. MAT'L | 2nd. & 3rd. MAT'L INDEX I=0 | |
|---|---|---|---|
| POSITIVE NONLINEAR | LINEAR | HIGHER | HIGH INTENSITY TRANSMISSION |
| POSITIVE NONLINEAR | NEGATIVE NONLINEAR | HIGHER | |
| POSITIVE NONLINEAR | SLOWER POSITIVE NONLINEAR | HIGHER | |
| SLOWER POSITIVE NONLINEAR | NEGATIVE NONLINEAR | HIGHER | |
| NEGATIVE NONLINEAR | LINEAR | LOWER | LOW INTENSITY TRANSMISSION |
| NEGATIVE NONLINEAR | POSITIVE NONLINEAR | LOWER | |
| NEGATIVE NONLINEAR | SLOWER NEGATIVE NONLINEAR | LOWER | |
| SLOWER POSITIVE NONLINEAR | POSITIVE NONLINEAR | LOWER | |
| NEGATIVE NONLINEAR | SLOWER NEGATIVE NONLINEAR | APPROX EQUAL | |
| SLOWER POSITIVE NONLINEAR | POSITIVE NONLINEAR | APPROX. EQUAL | |

HIGH INTENSITY TRANSMISSION LOGIC TABLE

| $I_1$ | $I_2$ | $I_R$ | $I_T$ |
|---|---|---|---|
| 0 | 0 | 0 | 0 |
| 0 | 1 | 0 | 1 |
| 1 | 0 | 1 | 0 |
| 1 | 1 | 1 | 1 |
| 2 | 0 | 0 | 2 |

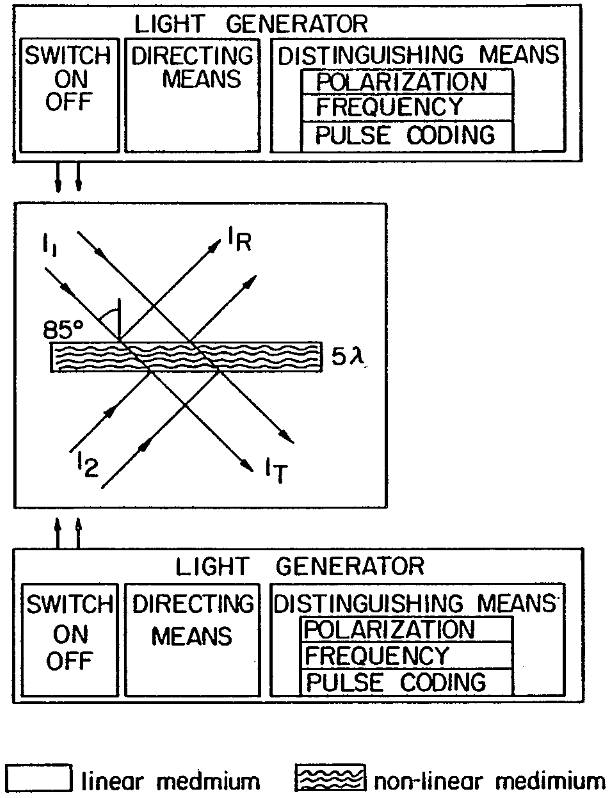

MODULAR INTERACTION GATE MATERIAL SELECTION TABLE

| 1st. MAT'L | 2nd. & 3rd. MAT'L | 2nd. & 3rd. MAT'L INDEX I=O | |
|---|---|---|---|
| POSITIVE NONLINEAR | LINEAR | HIGHER | HIGH INTENSITY TRANSMISSION |
| POSITIVE NONLINEAR | NEGATIVE NONLINEAR | HIGHER | |
| POSITIVE NONLINEAR | SLOWER POSITIVE NONLINEAR | HIGHER | |
| SLOWER POSITIVE NONLINEAR | NEGATIVE NONLINEAR | HIGHER | |
| NEGATIVE NONLINEAR | LINEAR | LOWER | LOW INTENSITY TRANSMISSION |
| NEGATIVE NONLINEAR | POSITIVE NONLINEAR | LOWER | |
| NEGATIVE NONLINEAR | SLOWER NEGATIVE NONLINEAR | LOWER | |
| SLOWER POSITIVE NONLINEAR | POSITIVE NONLINEAR | LOWER | |
| NEGATIVE NONLINEAR | SLOWER NEGATIVE NONLINEAR | APPROX EQUAL | |
| SLOWER POSITIVE NONLINEAR | POSITIVE NONLINEAR | APPROX. EQUAL | |

HIGH INTENSITY TRANSMISSION LOGIC TABLE

| $I_1$ | $I_2$ | $I_R$ | $I_T$ |
|---|---|---|---|
| 0 | 0 | 0 | 0 |
| 0 | 1 | 0 | 1 |
| 1 | 0 | 1 | 0 |
| 2 | 0 | 0 | 2 |

Fig. 3

THIN FILM OPTICAL COMPUTING

TECHNICAL FIELD

This invention relates to components useful in optical computing circuits, and more particularly to a modular interaction gate useful in thin film all-optical computing circuits.

BACKGROUND ART

U.S. Pat. No. 4,811,258 discloses a reversible, all optical implementation of an interaction gate. One embodiment of the interaction gate disclosed was a dual beam version of an optical nonlinear interface. An efficient means of multiplexing the nonlinear interface is required to simplify the design of the integration architecture.

Those concerned with this and other problems recognize the need for an improved modular interaction gate.

DISCLOSURE OF THE INVENTION

The present invention provides a modular interaction gate based on the interaction gate disclosed in U.S. Pat. No. 4,811,258, which Patent is hereby incorporated herein by reference. The modular interaction gate includes a first layer of material having a computing surface and an opposite multiplexing surface. A second layer of material is disposed in intimate contact with the computing surface to form a computing interface, and a third layer of material contacts the multiplexing surface to form a multiplexing interface. A pair of distinguishable computing beams is selectively directed upon the computing interface, and a pair of distinguishable multiplexing beams is selectively directed upon the multiplexing interface. The modular interaction gate is a thin film embodiment of an integration architecture useful in optical computing circuits.

An object of the present invention is the provision of an improved modular interaction gate.

Another object is to provide a thin film embodiment of a modular interaction gate.

A further object of the invention is the provision of a modular interaction gate that is utilized in designing all-optical circuits.

These and other attributes of the invention will become more clear upon a thorough study of the following description of the best mode for carrying out the invention, particularly when reviewed in conjunction with the drawings.

BRIEF DESCRIPTION OF THE DRAWINGS

FIG. 3 is a schematic showing a Modular Interaction Gate (MIG), also referred to as a nonlinear Thin Film Gate [RNI/Multiplexer or TFRM], with associated material selection table and logic table for high-intensity transmission.

BEST MODE FOR CARRYING OUT THE INVENTION

I. INTRODUCTION

Figure 1A:
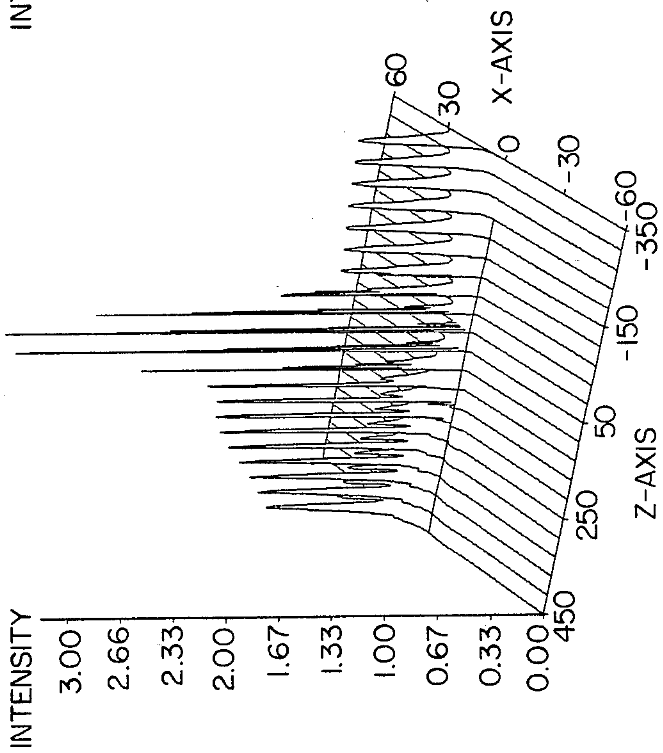
FIGS. 1(*a*)-1(*b*) are graphs illustrating numerical computations of intensity distributions for a 2d Gaussian beam incident at a nonlinear interface: (a) nondiffusive case at $\theta_o=87°$ with beam waist $2w_o=12$ μm, wavelength $\lambda=0.3$ μm, $\Delta=0.005$, $n_L=1.5$, $n_{2NL}I/\Delta=0.504$; (b) $n_{2NL}I/\Delta=1.008$. Note that the kerr media fills the negative -x half-space.

High-contrast switching at an interface between diffusive nonlinear media having opposite Kerr coefficients has been reported (see R. Cuykendall, "Three-Port Reversible Logic", Appl. Opt. 27, 1772 (1988).) based on 2-d simulations of the optical field redistribution effects. We have recently found similar behavior at the interface between linear and diffusive nonlinear media. With polarization-coded inputs these interfaces implement a symmetric self-controlled logic structure more powerful than a NAND gate, which is both noise tolerant and optically reversible (see R. Cuykendall and D. R. Andersen, "Reversible Computing: All-Optical Implementation of Interaction and Priese Gates", Opt. Comm. 62, 232 (1987); R. Cuykendall and D. R. Andersen, "Reversible Optical Computing Circuits", Opt. Lett. 12, 542 (1987).) Such a switching device has the additional advantage of computing the input signals at a surface, not while traveling through a bulk material. This is ideal for integration purposes since absorption losses can be minimized. Using linearly polarized light, the interface configuration manifests a computing device which possesses intrinsic three-terminal characteristics: insensitivity to noise, cascadability, inversion and fan-out.

Switching based on a nonlinear interface having one linear material leads to an intriguing integration architecture, assuming an idealized interface. The proposed thin film architecture for two-dimensional integration of computing circuits is based on the polarization-coded interface topology. It will be shown that both computing and multiplexing elements can in principle be constructed with thin films having the low-index linear material in common. This is a key feature in the proposed thin film architecture since it avoids additional interfaces (beam splitting) between different linear materials, which at high incident angles would cause non-negligible reflections, greatly complicating the circuits. Another feature is the multiple use of component layers, leading to simple compact circuits in two dimensions. Moreover, parallel integration in the third dimension can be achieved without additional manufacturing steps. The application of these ideas is demonstrated by designing a thin film binary half-adder, a full-adder and a carry-propagate adder.

II. THIN FILM COMPUTING

II.1. Nonlinear Interface Simulation

Numerical computations of the behavior of an incident two-dimensional Gaussian beam at the interface between linear and nonlinear media have been carried out on a CRAY X-MP/48. A diffusive Kerr-like nonlinearity has been assumed relating the intensity of the beam I to the nonlinear mechanism density p through the one-dimensional diffusion equation $$D_o \frac{\partial^2 p}{\partial x^2} + G_o I - \frac{p}{\tau} = 0, \quad (1)$$

where x is the distance from the interface. In this equation $D_o$ represents the diffusion coefficient, $G_o$ the generation-rate coefficient and t the re-combination time constant for the nonlinear mechanism. The quantity p may represent the density of free carriers, excited gas atoms or heat, etc., and is assumed proportional to the local nonlinear index of refraction:

$$n_{2NL}I = n_{2p}P. \quad (2)$$

Diffusion along the interface (z-direction) was neglected due to the slow variation of the wave envelope in that direction at high incident angles ($\theta_o \gtrsim 80°$).

The calculational technique employed (see D. R. Andersen, R. Cuykendall and J. Regan, "SLAM-Vectorized Calculation of Refraction and Reflection for a Gaussian Beam at a Nonlinear Interface in the Presence of a Diffusive Kerr-like Nonlinearity", Comp. Phys. Commun. 48, 255 (1988)) is similar to those of Tomlinson et al. and Marcuse (see W. J. Tomlinson, J. P. Gordon, P. W. Smith and A. E. Kaplan, "Reflection of a Gaussian Beam at a Nonlinear Interface", Appl. Opt. 21, 2041 (1982); D. Marcuse, "Reflection of a Gaussian Beam from a Nonlinear Interface", Appl. Opt. 19, 3130 (1980)). However their analysis assumed a strict Kerr nonlinearity with no diffusion of the nonlinear mechanism. Nondiffusive results obtained from the calculations were previously found to agree exactly with those obtained by Tomlinson et al. When carrier diffusion is modeled, the results differ qualitatively due to the nonlocal behavior of the nonlinearity. With diffusion, the index gradient changes slower than the intensity gradient, simulating more the planewave than diffusionless Gaussian behavior. To study the switching from total internal reflection (TIR) to transparentization of the interface by a Gaussian-like beam two parameter sets were selected: one for an incident angle $\theta_o = 87°$ (see FIGS. 1 and 2) and one for $\theta_o = 85°$. The offset of the linear refractive index (Δ) was in the former case 0.005, and in the latter 0.01, resulting therefore in a slightly different ratio of incident angle to critical incident angle. All results were calculated for a beam waist $2w_o \doteq 40\lambda$, a linear refractive index $n_L = 1.5$ and wavelength $\lambda = 0.3$ μm. In order to allow comparison between the nondiffusive and the diffusive case, the product $n_{2NL}I$ was varied until a pair was found which showed the 'best' switching behavior for one (FIGS. 1*a*, 2*a*) and two times (FIGS. 1*b*, 2*b*) the intensity. Note that in the particular case shown (not necessarily the optimal parameter set, as discussed later) input intensities 65 times greater were required in the diffusive case to effect an index change of 0.005 in the nonlinear medium. This greater intensity is required to change the index of refraction over a broader area (due to diffusion) than the incident beam actually samples.

Figure 1B:
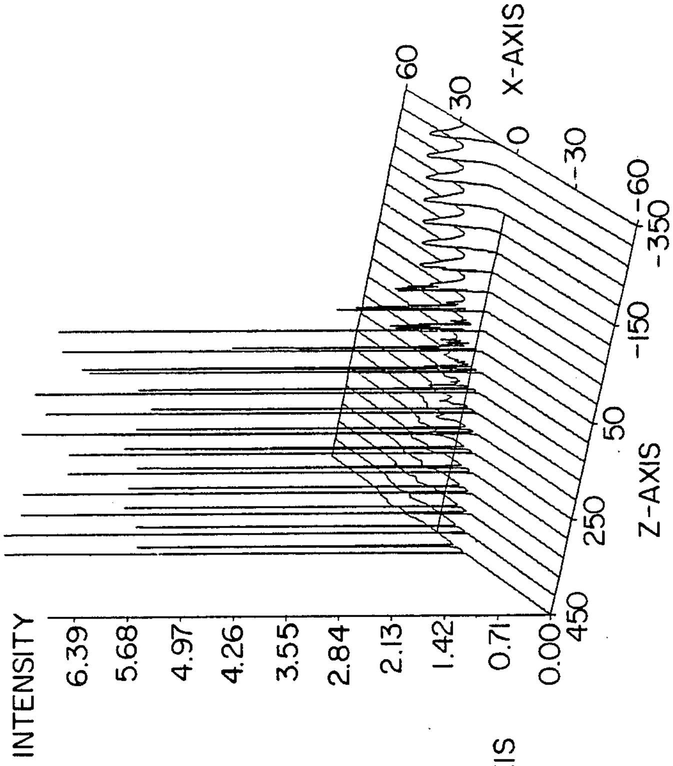

FIG. 1*b* shows, in the absence of diffusion, beam breakup into two transmitted self-focussed channels. Each channel appears to emanate from an interference fringe crossing the interface. Calculated intensity distributions are shown only for the case $\theta_o = 87°$ since qualitatively equivalent switching behavior was found at $\theta_o = 85°$. However, since the latter case represented operation closer to the critical incident angle for TIR, the nondiffusive 'best pair' turns out to correspond to a single transmitted channel instead of two channels as in FIG. 1*b*. The pair intensities in this instance happen to be very close to the threshold at which an additional interference fringe switches through the interface: with only a 4% increase in intensity the 'TIR case' forms a transmitted self-focussed channel, while the 'transmit case' now forms two self-focussed channels. The $\theta_o = 87°$ results are shown because it illustrates best pair behavior more typical of previously published results: FIG. 1*b* comprises a small glancing angle analog of the plot reported by Smith et al. (see FIG. 9 plot in P. W. Smith, W. J. Tomlinson, P. J. Maloney and J. P. Hermann, "Experimental Studies of a Nonlinear Interface", IEEE J. Quant. Elect. 17, 340 (1981)). FIG. 2*b* shows notable reduction in breakup into self-focussed channels in the nonlinear transmission region for diffusive nonlinear media. It can also be seen (comparing FIG. 1*a* and 2*a*) that self-focusing of the reflected beam due to the nonlinear Goos-Hanchen effect discussed by Smith et al. is substantially reduced. The reduction in self-focusing is attributed to the smearing of the nonlinear lens by the diffusion of p. Depending on the actual materials selected, p may or may not diffuse across the interface. However, diffusion across the interface boundary seems to reduce the chance of forming a surface wave (see P. Varatharajah, A. Aceves, J. V. Moloney, D. R. Heatley and E. M. Wright, "Stationary Nonlinear Surface Waves and Their Stability in Diffusive Kerr Media," Opt. Lett. 13, 690 (1988)). Hence, in the diffusive results shown here the nonlinear mechanism p has been permitted to diffuse into the sourceless linear material in order to avoid further complications due to surface wave formation.

It is believed that the apparent self-deflection of the transmitted beam back toward the interface (see FIG. 2*b*) is caused primarily by modelling diffusion only in the z-direction, and secondarily by the paraxial approximation, both of which were necessary to keep run times within reasonable limits. Since this is a cumulative numerical effect, the deviation from the true propagation direction increases as the beam penetrates the nonlinear medium. This is consistent with the observed behavior: the higher the transmitted intensity and the greater the incident angle, the shorter the length scale where this self-bending is notable. The above explanation is further supported by the significant reduction in self-deflection in the nondiffusive case shown in FIG. 1*b*. This suggests that the only other form of related self-bending known to the inventors, the self-deflection of beams with asymmetric beam profile in nonlinear mediums (see G. A. Swartzlander, Jr. and A. E. Kaplan, "Self-Deflection of Laser Beams in a Thin Nonlinear Film", J. Opt. Soc. Am. B 5, 765 (1988)), cannot be the cause for the observed self-bending. The inventors know of no physical effects in the nondiffusive case which would cause the transmitted beam profile to be significantly less asymmetric than in the diffusive case. For that reason, it is believed that self-bending in reality will not occur on the length scale of interest. If for any reason the input beam is sufficiently asymmetric (e.g. half-Gaussian) to cause self-deflection on the length-scale of the interface, problems will arise in cascading multiple interfaces.

The calculation results indicate that nearly whole beam switching at a nonlinear interface should be possible with real (Gaussian) input beams. Moreover, the computations validate the conceptualization of the nonlinear interface using polarized inputs, since by the techniques of Kaplan and Smith et all. (see A. E. Kaplan, "Theory of Hysteresis Reflection and Refraction of Light by a Boundary of a Nonlinear Medium", Sov. Phys. JETP 45, 896 (1977); W. Smith, W. J. Tomlinson, P. J. Maloney and J. P. Hermann, "Experimental Studies of a Nonlinear Interface", IEEE J. Quant. Elect. 17, 340 (1981)), both the critical switching intensity $I_c$ and the amplitude reflectivity r of an incident beam I are independent of the plane of polarization of the incident light for sufficiently high incident angles $\theta_o$. While these specific numerical experiments were carried out for a distance of 800 $\mu$m along an imaginary interface boundary in order to observe the stability of the computed solution beam, the actual device size is determined by incident angle, beam waist and the requirements for TIR, as discussed below.

Figure 2:
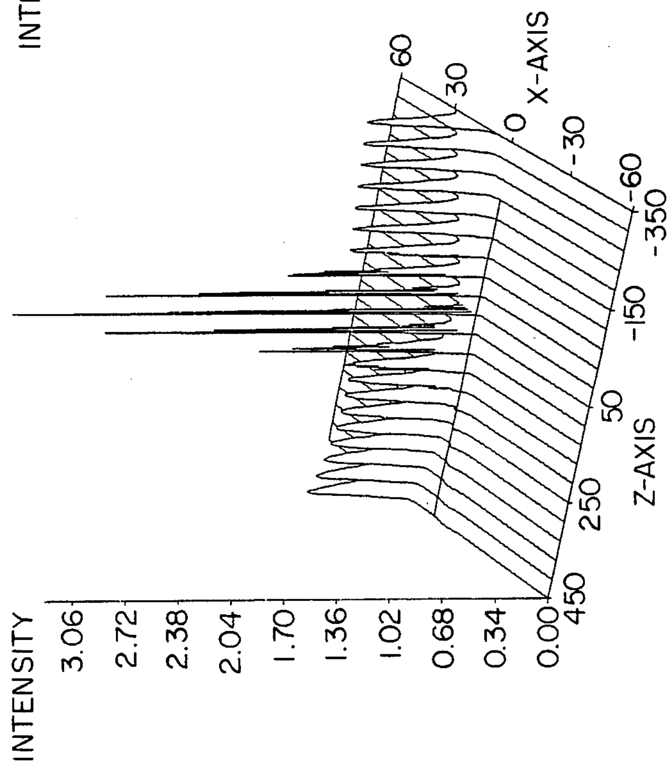
FIGS. 2(*a*)-2(*b*) are graphs illustrating numerical computations of intensity distributions for a 2d Gaussian beam incident at a nonlinear interface: (a) diffusive case at $\theta_o=87°$ with diffusion length $L_D=20$ μm, beam waist $2w_o=12$ μm, wavelength $\lambda=0.3$ μm, $\Delta=0.005$ $n_L=1.5$, $n_{2NL}I/\Delta=32.76$; (b) $n_{2NL}I/\Delta=65.52$.
Figure 2:
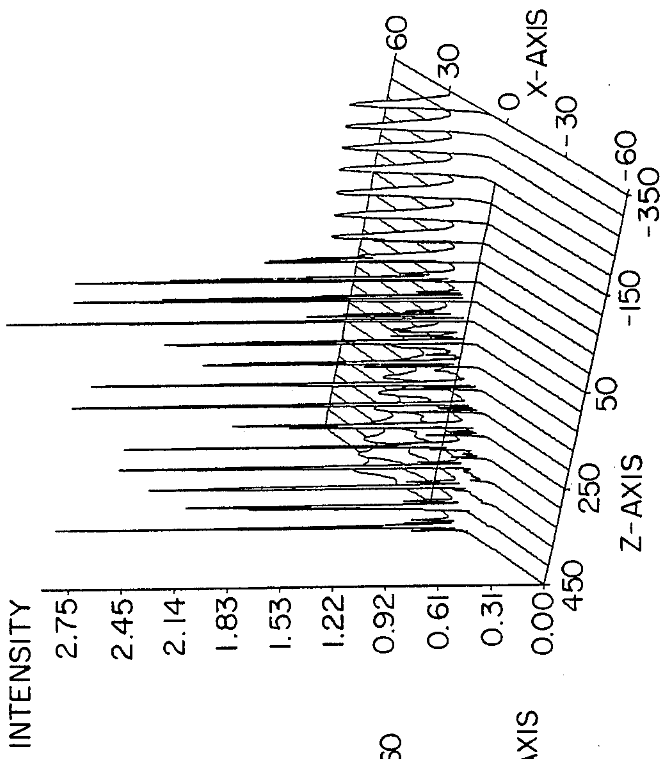

FIG. 2 shows nonlinear interface switching for specific ratios of wavelength $\lambda$ to beam waist $2w_o$ to diffusion length $L_D$. Higher offsets ($\Delta > 0.01$) in the diffusive case at $\theta o \lesssim 85°$ required switching intensities outside the range where the computer program worked reliably. However, it is believed there is no reason why the nonlinear interface should behave differently at higher offsets. Limited effort was devoted to finding the optimal parameter set ($\theta_o$, $\Delta$, $w_o$, $L_D$, $n_L$, etc.), since actual transmission characteristics will differ from the 2d predictions anyway. With this in mind, the possibility of circuit integration was investigated (using the nonlinear interface as the single computing element) basing the calculations on the 'standard model' parameter values selected originally by Tomlinson et al. (see W. J. Tomlinson, J. P. Gordon, P. W. Smith and A. E. Kaplan, "Reflection of a Gaussian Beam at a Nonlinear Interface", Appl. Opt. 21, 2041 (1982)): $\Delta = 0.02$, $\theta_o = 85°$, $n_L = 1.5$.

II.2. Nonlinear Thin Film Gate

Since the computing of the input signals occurs at a surface and not while traveling through a bulk material, the nonlinear medium can be reduced to a very thin film. In this case the absorption losses would be minimal. A schematic diagram of a thin film realization of a nonlinear interface is shown in FIG. 3. The logic table defines the allowable cases, based on the assumption that a beam with intensity 1 is reflected while a beam with intensity 2 is transmitted through the diffusive nonlinear film. The thin film gate can be used, with some restriction (e.g. $I_1 = 2$ implies $I_1 = 0$), both from the top ($I_1$) and from the bottom ($I_2$) side, allowing some limited polarization-independent multiplexing with the computing element itself. Note that $I_1$ is the computing input while the $I_2$ input only reflects (multiplexes).

The minimum thickness of the nonlinear thin film in FIG. 3 follows from the requirement to guarantee total internal reflection for the case when $I_1 = I_2 = 1$. The calculation below is shown in the plane wave approximation neglecting the intensity-dependence of the index of refraction of the nonlinear film. [A more careful analysis shows that these approximations increase the minimum thickness value only slightly ($\approx 1\%$)]. For total internal reflection the refracted wave is therefore propagated only parallel to the surface and is attenuated exponentially beyond the interface. The attenuation is described by the exponential factor:

$$\exp\left[-2\pi(2n_L\Delta - \Delta^2 - n_L^2 \cos^2\theta_o)^{\frac{1}{2}} x/\lambda\right]$$

where $n_L$ is the index of refraction of the linear medium, $n_L - \Delta$ is the index of refraction of the nonlinear film for negligible intensities, and x is the depth of penetration. For $\Delta = 0.02$, $\theta_o = 85°$ and $n_L = 1.5$ at a depth of $x = 2.5\lambda$, the electric field is attenuated by more than factor of 20. Choosing the thickness of the nonlinear medium as $5\lambda$, the total internal reflection in the case $I_1 = I_2 = 1$ is therefore assured. The minimum length of the nonlinear medium, and therefore of the nonlinear thin film gate, on the other hand, should be at least $$l = 4w_o/\cos\theta_o + 5\lambda \tan\theta_o \qquad (3)$$

which is twice the projection of a beam with diameter $2w_o$ at the nonlinear interface, plus the offset of the beam after traveling through a 51 thick layer of the nonlinear medium. The minimal width of the nonlinear film is twice the beam waist: $4w_o$.

III. POLARIZATION SENSITIVE WIRING

Optical circuits, as the name already implies, use light beams to carry information from one elementary computing element (optical gate) to the other. Even if two beams are spatially superimposed they can still be distinguished if their polarization and/or frequency is different. With the help of optical elements like mirrors horizontal polarizers, $\lambda/2$ plates, prisms, filters, etc., the necessary spatial separation and directioning of the individual channels to the individual computing elements can then be obtained. These optical multiplexers are, in addition to the elementary computing elements, the key elements of every optical circuit which contain more than one gate. If they can be integrated, complex all optical integrated circuits can be built.

Since the interest is basically a two-dimensional integrated optical solid state circuit which uses the thin film gate as the elementary computing element, the discussion is restricted to the case of the polarization dependent wiring for a single frequency. That means that a way must be found to integrate the polarizer which transmits the horizontal polarization and reflects the vertical polarization (v-mirror), and/or a polarizer which transmits the vertical polarization and reflects the horizontal polarization (h-mirror). If a way is also found to integrate phase retarders, possibly using the same techniques, there will exist a 'set of tools' allowing one to solve nearly every polarization sensitive wiring problem which might come up in designing a complex optical circuit involving multiple thin film gates and their connections.

There exist basically two kinds of polarizers: one is based on the birefringence of certain optical anisotropic crystals, and the other is based on the Brewster angle in connection with interference in thin film multilayer stacks. The former approach has a much better performance, but it is doubtful if it can be integrated, since there is little hope that a $\mu$m-high "Glan-Thompson prism" can be made with reasonable effort. Fortunately, the second kind of polarizer has the option to be very thin (on order of $\lambda$), and does not require angles which deviate from zero as does the prism polarizer. Even if the stack polarizer performance is worse, it is, as will be shown below, still sufficient to allow circuit integration in conjunction with the thin film gate.

III.1. Thin Film Multilayer Stack

To calculate characteristic values like the total reflection, transmission, etc. of a given thin film multilayer stack, we use the matrix method extensively described by H. A. Macleod (see H. A. Macleod, *Thin-Film Optical Filters,* 2nd Edition, Adam Hilger Ltd., Bristol (1986)). Among all of the methods described there, this is the most natural way for a numerical implementation of this problem. The refractive index of a given film layer (r) can in general be described by the complex quantity $$N_r = c/v_r = n_r - ik_r \tag{4}$$

where $n_r$ is the real index of refraction (or often simply the refractive index), and $k_r$ is related to the absorption coefficient $\alpha_r$ by $\alpha_r = 4\pi k_r/\lambda$ in an ideal dielectric material. A plane wave with wavelength $\lambda$ traveling through a layer of thickness $d_r$ at an angle $\theta_r$ measured against the normal of the incident surface suffers a phase shift $d_r$, where $$\delta_r = \frac{2\pi}{\lambda} N_r d_r \cos\theta_r = \frac{\pi}{2}\,\frac{\lambda_r^o}{\lambda} = \frac{\pi}{2} g_r \tag{5}$$

$\lambda_r^o$ is the wavelength where the r-th layer acts like a $\lambda/4$ wavelength stack and $g_r$ is the relative thickness of the r-th layer. The reflection (R), transmission (T), absorption (A) and the phase change on reflection ($\phi$) of a thin film multilayer stack is then simply given by $$R = \left|\frac{\eta_o B - C}{\eta_o B + C}\right|^2,\ T = \frac{4Re\{\eta_o\}Re\{\eta_m\}}{|\eta_o B + C|^2},\ A = 1 - R - T \tag{6a}$$

and

-continued $$\phi = \tan^{-1}\left(\frac{i\eta_m(CB^* - BC^*)}{\eta_m^2(BB^* - CC^*)}\right), \tag{6b}$$

where B and C follow from the matrix multiplication over the q layers of the multilayer stack:

$$\begin{bmatrix} B \\ C \end{bmatrix} = \left(\sum_{r=1}^{q} \begin{bmatrix} \cos\delta_r & (i\sin\delta_r)/\eta_r \\ i\eta_r\sin\delta_r & \cos\delta_r \end{bmatrix}\right)\begin{bmatrix} 1 \\ \eta_m \end{bmatrix} \tag{7}$$

The suffix "o" has been used to denote the entrance substrate and "m" to denote the exit substrate of exit medium. The admittance values $g_r$ are defined by $$\eta_r = [\epsilon_o/\mu_o]^{\frac{1}{2}}\eta_r\cos\theta_r \text{ for } v\text{-polarization } (TE) \tag{8}$$

and $$\eta_r = [\epsilon_o/\mu_o]^{\frac{1}{2}}\frac{\eta_r}{\cos\theta_r} \text{ for } h\text{-polarization } (TM). \tag{9}$$

If $\theta_o$, the angle of incidence, is given, the values of $\theta_r$ can be found from Snell's law, i.e.

$$N_o \sin\theta_o = N_r \sin\theta_r = N_m \sin\theta_m. \tag{9}$$

With these equations, every combination of thin film layers can easily be analyzed. Since the admittance $\eta$ is different for vertical (v) and horizontal (h) polarized waves, the reflection, transmission, etc., will in general be different for both polarizations. The first thin film polarizer based on this property was designed by MacNeille (see S. M. MacNeille, U.S. Pat. No. 2,403,731 (1946)). He used only three layers which were enclosed by two glass prisms. Since then, through improved film deposition techniques, the use of more layers (10–20) and computer-optimized thickness determination of the individual layers, the wavelength and angle of incidence region over which the thin film polarizer maintains its performance has been signficantly improved (see H. A. Macleod, *Thin-Film Optical Filters,* 2nd Edition, Adam Hilger Ltd., Bristol (1986); R. P. Netterfield, "Practical Thin-Film Polarizing Beam-Splitters", Optica Acta 24, 69 (1977)). These polarizers, which are now commercially available, use an incident angle $30° \leq \theta_o \leq 60°$, and most of them gain from the fact that the Brewster angle $\approx \theta_o$. In order to design a polarizer at an angle $\theta_o \approx 85°$ the Brewster angle 'cannot' be used because there exists no known material which has an index of refraction $>11$, a negligible absorption, and which can be deposited as a film of controlled thickness.

On the other hand, polarization sensitive wiring in the integrated optical circuits of the present invention needs only a very restricted polarizer: one which has an extinction of roughly 3% for a "single" frequency and a fixed angle. Such a polarizer can indeed be designed, and it takes only three layers to obtain (at least in theory) the desired performance. Of course, by using more layers, carefully designing the thickness of each individual layer, and by using appropriate indices of refraction, this thin film polarizer can be optimized. However, only the general feasibility of such a specific integrated optical solid state circuit is contemplated herein.

III.2. Micro-polarizer (v-mirror)

Figure 4:
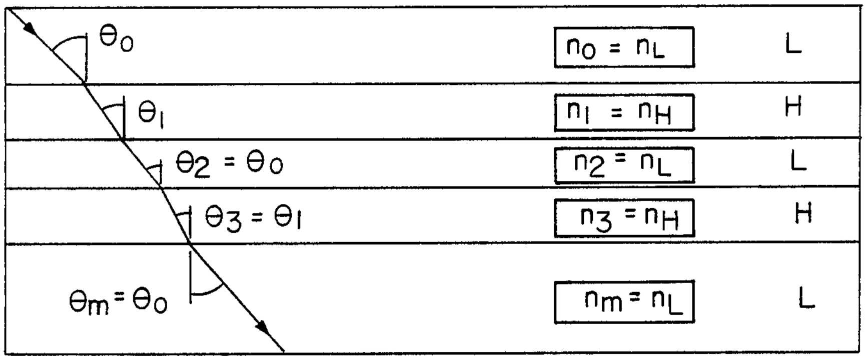
FIG. 4: is schematic of the simplest three layer thin film polarizer L(HLH)L. Only the transmitted beam is shown.

The simplest thin film polarizer is a symmetrical three layer stack (HLH) formed by alternating thin films with high (H) and low (L) index of refraction which itself is enclosed by the same material which forms the middle layer. That means we have to investigate the reflection in a L(HLH)L system as shown in FIG. 4.

There exists today a large variety of materials which can be deposited in the form of thin films (see H. A. Macleod, *Thin-Film Optical Filters,* 2nd Edition, Adam Hilger Ltd., Bristol (1986)), with refraction-index ranges roughly from 1.25 to 2.6. Given a material, its refractive index still depends somewhat on the wavelength as well as the deposition conditions and techniques. As discussed previously, it is desirable to use a L-material the same material as the linear medium in the nonlinear thin-film gate. A material with $n_L=1.5$, having a negligible absorption, and which can be deposited in any needed film thickness is assumed. The H-material should have an index of refraction which is as high as possible in order to approach the Brewster angle, giving a better extinction coefficient. A material with $n_H=2.35$ is chosen, again with negligible absorption. This could be, for example, ZnS which is already being used extensively in thin film polarizer production. Since the angle of incidence is determined by the thin film gate, there are only two free parameters, $d_1/\lambda$ and $d_2/\lambda$ which can be adjusted to get the optimum polarizer. The contour plots in FIG. 5 obtained with equations 6a and 7–9 shows the dependence of $R_v$ and $R_h$ upon the two parameters $g_1$ and $g_2$. Only the most interesting parameter region is shown. The region of zero reflection is in general different for both polarizations, and also narrower for the v- than for the h-polarization. The best reflection which can be obtained for the h(v)-polarization in a region where the reflection is negligible for the v(h)-polarization is $\approx 75\%$ (98.8%). The optimum v-mirror reflects therefore, only 1.2% of the h-polarization. The optimum h-mirror, on the other hand, has a reflection loss for the v-polarization that cannot be made smaller than 25%. This thin film h-mirror cannot therefore be used in our optical integrated circuits. This is no catastrophe, as it can be substituted by a combination of a v-mirror, conventional mirrors, and/or λ/2-plates. This will be discussed in the next section more extensively.

Since $g_r$ is a function of $\cos\theta_r$, a small change in $\theta_o$ will change the $g_r$'s significantly: $g_1(85°\pm1°)=g_1(85°)(1\pm0.2\%)$ and $g_2(85°\pm1°)=g_2(85°)(1\pm20\%)$. How this affects the performance of the v-mirror can be seen from FIG. 5 and FIG. 6. In the first figure a bar has been used to visualize the range of variation. FIG. 6 shows the variation of $R_v$ and $R_h$ with $g_2$ for the 'optimum' v-mirror ($g_1=0.53$ and $g_2^*=0.193$) and also for the parameter combination $g_1=0.8$ and $g_2^*=0.071$. Note that tht latter combination is less sensitive to small imperfections in the alignment, film, thickness, etc. It has an $R_v\geqq 93\%$ and $R_h\leqq 10\%$ for $\theta_o=85°\pm1°$, while for the optimum mirror we find $R_v>97\%$ and $R_h\leqq 25\%$. Considering that we are interested in a v-mirror with a 'symmetrical' reduction in the performance for small deviations from the ideal parameter set for both polarizations, the optimum v-mirror is clearly not the best choice. With the restriction that $Rv\geqq 97\%$, it is found from FIG. 5 that the parameter $g_1=0.8$ and $g_2=0.071$ are a much better choice, resulting in a v-mirror which is the 'best' compromise for the application of interest. The best v-mirror has therefore the film thicknesses $d_1=\lambda/9$ and $d_2\lambda/7.4$, so that the whole micro v-mirror is only λ/2.8 thick.

III.3. Micro λ/2-mirror

As discussed above, the performance of an h-mirror based on thin film techniques is far from being satisfactory. But, as will be shown below, it is very easy to make a λ/2-mirror using the same thin film technique which was used to 'produce' a v-mirror. A λ/4-mirror can be produced in a similar way. A polarizer and a phase retarder made with thin film techniques, together with a conventional mirror, are a 'complete set of tools' with which nearly every polarization sensitive wiring problem can be solved (both in the proposed optical circuits as in most other optical integrated circuits using polarization coded beams as well).

A λ/2-mirror can be made using the fact that during total internal reflection both polarizations suffer (in general) a different phase delay. With the available materials it is not possible to make a phase delay of λ/2 with a single total reflection. But by adding an additional layer between the incident medium and the total reflection layer, the desired phase delay can be obtained (see H. A. Macleod, *Thin-Film Optical Filters,* 2nd Edition, Adam Hilger Ltd., Bristol (1986)).

Figure 5:
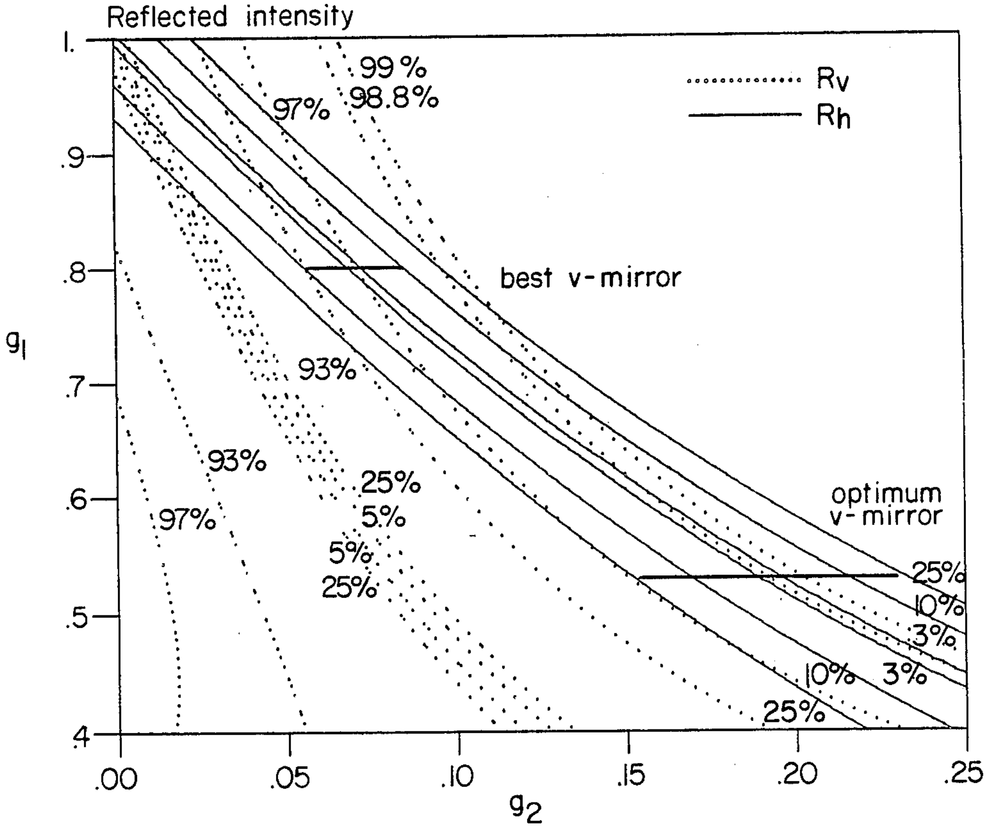
FIG. 5 is a graph illustrating contour plots of $R_v$ (dotted line) and $R_h$ (solid line) with dependent parameters $g_1$ and $g_2$. The bars show the variation of the performance for $\theta_o=85°\pm1°$ for the 'best' and the 'optimum' v-mirror.
Figure 6:
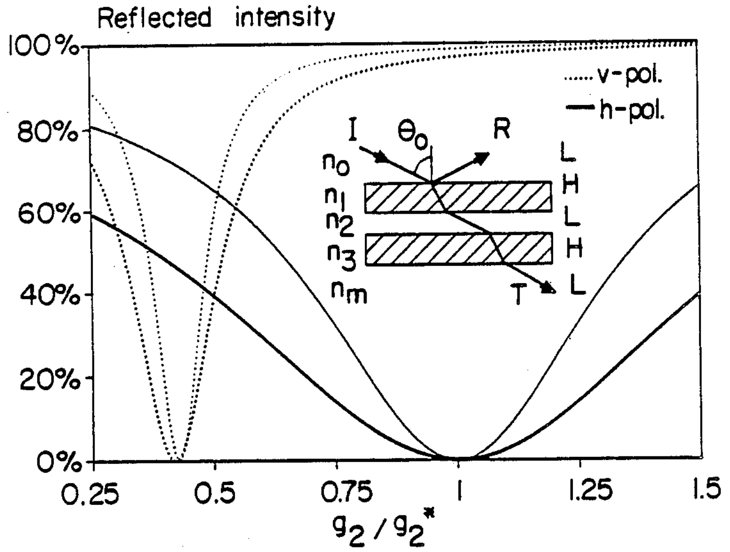
FIG. 6 is a graph illustrating variation of the calculated reflected intensity of a symmetric three layer stack L(HLH)L ($\theta_o=85°$, $n_o=n_2=n_m=n_L=1.5$ and $n_1=n_3=n_H=2.35$) with $g_2/g_2^*$ for $g_1=0.53$, $g_2^*=0.193$ (thin line) and $g_1=0.8$, $g_2^*=0.071$ (thick line). Note that the v-polarization (dotted line) and the h polarization (solid line) have zero reflectance at different $g_2$ values.
Figure 7:
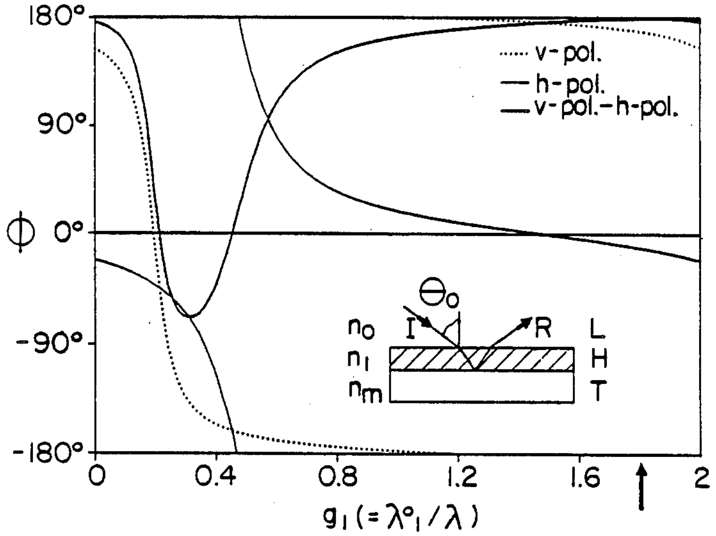
FIG. 7 is a graph illustrating the calculated phase change on reflection of total reflected double layer L(HT) ($\theta_o=85°$, $n_o=n_L=1.5$, $n_1=n_H=2.35$ and $n_m=n_T=1.38$) with $g_1$. The arrow shows for which $g_1$ the phase difference between the v- and h-polarized beam ($\phi_v-\phi_h$) corresponds to $\lambda/2$.

FIG. 5 shows the calculated phase change (using eq. 6b) on reflection of a total reflectant double layer depending on the relative thickness $g_1$. The angle of incidence is again 85° and $n_o=n_L=1.5$. For the intermediate layer, again the H-material has been chosen , so that $n_1=n_H=2.35$. This minimizes the number of materials necessary for a miniaturized optical solid state circuit. For the total reflectant (T), a material with $n_T=1.38$ is used. That is the index of refraction of $MgF_2$, the most used thin film material. For $g_1=1.83$ the phase difference $\phi_v-\phi_h=180°$, indicated in FIG. 7 by an arrow.

Note that the λ/2-mirror is much less sensitive to small deviations from the ideal case than the v-mirror. The phases $\phi_v$ and $\phi_h$ primarily depend only on $g_1$ and not also, as the v-mirror, on $g_2$. Furthermore $g_1$, as has already been pointed out, is far less sensitive to small deviations than $g_2$. Inserting the value $g_1=1.83$ in eq. (5) gives the necessary thickness of the H-layer: $d_1\approx\lambda/4$. The minimum thickness of the total reflectant T-layer follows from the TIR requirement. To keep the leakage through the T-film less than 0.2%, the T-film has to have a minimum thickness $d_2=1.25\lambda$, so that the whole micro λ/2-mirror is therefore only 1.5λ thick.

IV. THIN FILM ARCHITECTURE

The combination of the nonlinear thin-film computing and multiplexing elements designed above, where both have the L-material in common, results in an architectural technique which is very powerful for designing compact integrated all-optical computing circuits. This will be demonstrated by showing the integration of two thin film gates to form a half-adder. The next two steps of integration are also addressed: (1) the combination of thin film half-adders to construct a 1-bit binary full-adder, and (2) the cascading of full-adders to form an n-bit carry-propagate adder.

IV.1 Thin Film Half-Adder

Figure 8:
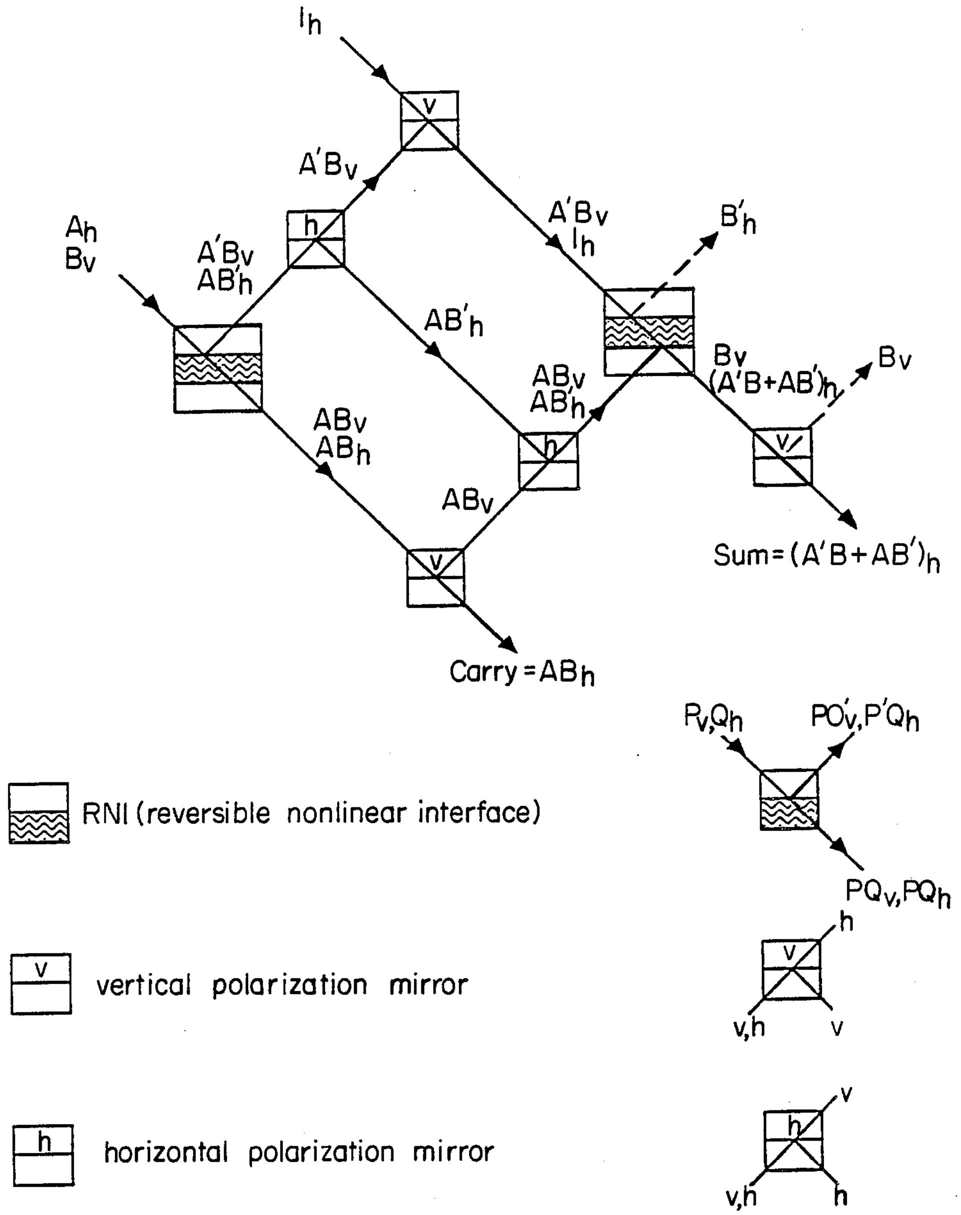
FIG. 8 is a schematic showing a nonlinear interface half-adder with v- and h-mirrors.

Combining the nonlinear thin-film computing and multiplexing elements designed above, an integration architecture is illustrated by designing a binary half-adder. A 1-bit half-adder performs modular 2 addition of two binary digits $A_i$ and $B_i$, and outputs the sum $A_i \oplus B_i$. FIG. 8 shows a schematic diagram of a half-adder where only two [note that a transistor-based half-adder needs on the order of 16 computing primitives (transistors)] nonlinear thin film gates (computing primitives) have been used, and the multiplexing is done with v- and h-mirrors. Because of the intrinsic difference of h- and v-polarized beams (only h-polarized beams 'have' a Brewster angle), thin film polarizer performance is far better for v-mirrors.

Figure 9A:
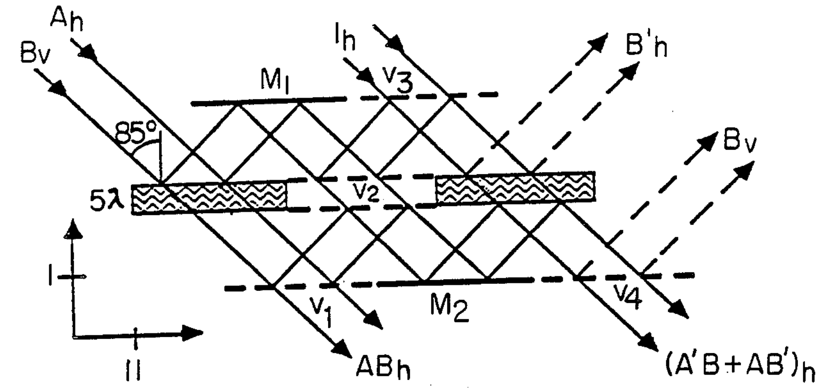
FIGS. 9(*a*)-9(*c*) are schematics showing a thin film half-adder: (a) smallest volume, (b) most flexible and (c) simplest to manufacture.
Figure 9B:
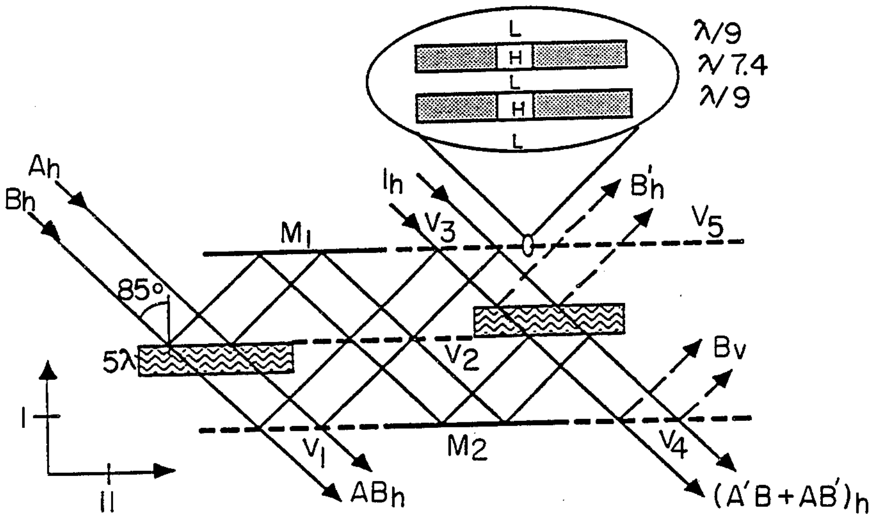
Figure 9C:
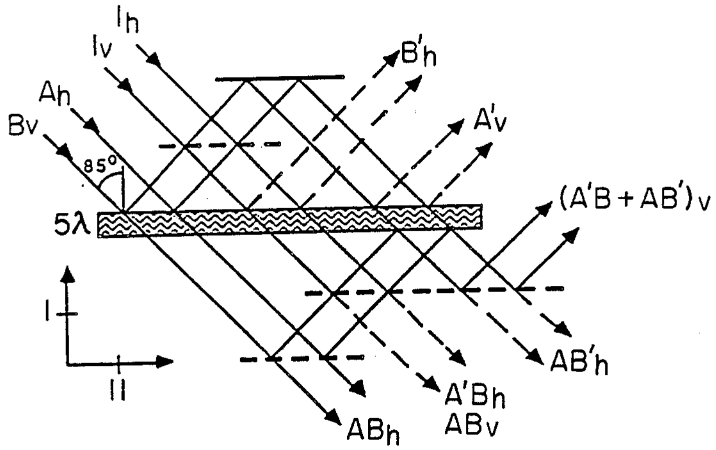
Figure 10:
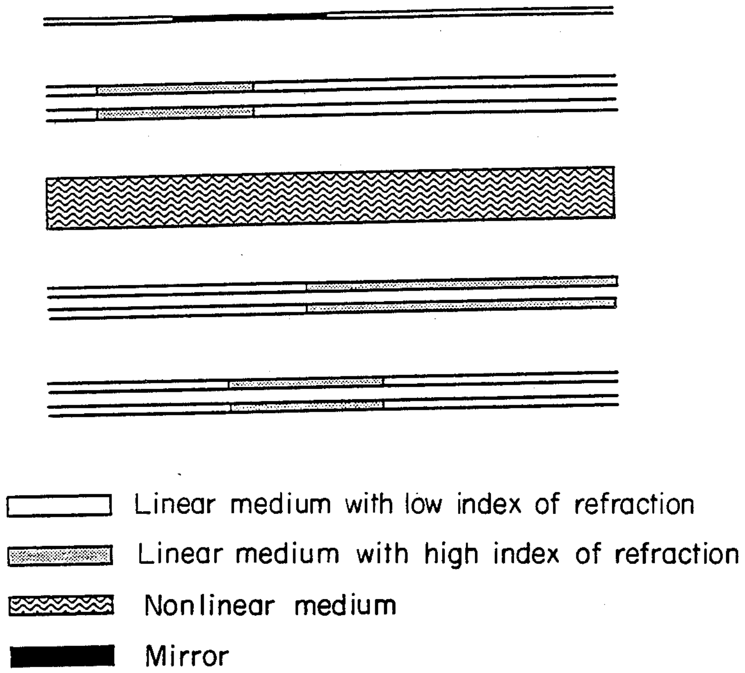
FIG. 10 is a schematic layout for a thin film half-adder corresponding to FIG. 9*c*.

Three different thin film realizations of a half-adder are shown in FIG. 9. The pictures are drawn to scale (except for the thickness of the nonlinear medium) for an incident angle $\theta_o = 85°$. The y-dimension has been blown up by a factor of eleven for improved visualization. The solid lines show the computing beams while the dashed lines show additional unavoidable signal channels (duplication and inversion of the v-input signal) characteristic of the thin film logic. The half-adder version in FIG. 9a requires the smallest amount of space. The version in FIG. 9b is roughly 5% longer than that in FIG. 9a, but uses the least number of circuit elements. It is also the most flexible design: (1) it is transparent to an h-beam traveling from $V_1$ to $V_3$ (or vice versa) and can therefore be used to communicate with circuits in planes above or below the actual half-adder, and (2) substitution of the polarizer $V_1$ or $V_3$ with a conventional mirror M allows redirectioning of some of the inputs and outputs. Note that the two h-mirrors in FIG. 5 have been replaced in FIGS. 9a, b by the conventional mirrors $M_1$, $M_2$ and the v-mirror $V_2$. This also reduces the minimum volume required for these designs by a factor of two. The third half-adder, shown in FIG. 9c, is twice as high as the other and needs an additional pump beam, but it has the definite advantage of a contiuous rather than interrupted nonlinear thin film, and is therefore easiest to manufacture. The design (c) is 'independent' of the nonlinear film thickness, while designs (a) and (b) have a small such dependence. FIG. 10 shows the half-adder in FIG. 9c emphasizing the layered structure, comprising 15 layers. Note that the minimum-layer design (FIG. 9b) requires only 12 layers.

To estimate the theoretical minimum volume requirement for a thin film half-adder, we consider here only the case in FIG. 9a. The outer cases follow in a straightforward manner. The minimum distance between the two nonlinear thin film gates in FIG. 9a is again the length of the nonlinear thin film defined by eq.(4). Thus l is the characteristic minimum length scale for this half-adder realization. The smallest half-adder has then a length $L_{ha} = 3l$ and a height $H_{ha} = l/\tan\theta_o + 5\lambda + 2\lambda/2.8$, where the thickness of the v-mirrors, $V_1$ and $V_3$ has been included.

All three dimensions of the half-adder depend linearly on the beam waist $2w_o$. Gaussian beams ($TEM_{oo}$), the kind of beams we are dealing with, have the following beam waist dependence:

$$w(z) = w_o[1 + (z/z_R)^2]^{\frac{1}{2}} \tag{10}$$

$$z_R := \pi w_o^2 n/\lambda$$

where z is the distnace from the focus, $2w_o$ is the minimum beam waist and n the index of refraction of the medium through which the beam is traveling. Only over a distance $|z| << z_R$ can a Gaussian beam be approximated by a parallel beam.

For the operation of the thin film half-adder, it is necessary that the intensity incident on the individual nonlinear thin film gates be independent of the path through which the light beam reaches the gates. That means the longest path which is allowed between the individual gates in the circuit has to be $<< 2z_R$. This criterion limits the tightness of the focusing, and therefore the minimal size of the optical circuits, unless the beam travels in a waveguide from one element to the other, or soliton pulses can be used. The latter requires that the L-medium be nonlinear and will be discussed in a future paper. [By conrolling the diffusion coefficient rate for a given thickness of nonlinear medium, one should actually be able to control the self-focusing in order to improve cascadability of a single thin film gate by minimizing beam expansion after exiting the nonlinear material.]

The longest path between the two nonlinear thin film gates in the half-adder (FIG. 9) is $$L_{max} = 2l/\sin\theta_o \approx 2l. \tag{11}$$

An intensity attenuation of 10% corresponds to a beam diameter change of 4.9% and to a distance $|z| = 0.32\ z_R$ from the focus. Using this as a criterion to calculate the minimum beam waist, we obtain from equations (10) and (11) the relation $$0.32\ z_R = \frac{0.32\pi w_o^2 n_L}{\lambda} = L_{max}/2 \approx 46 w_o + 57\lambda. \tag{12}$$

The solution of this equation is $w_0 \approx 32\lambda$. Inserting this value in eq.(4) we obtain for the minimum volume of a thin film half-adder $$V_{ha} = L_{ha} \times H_{ha} \times 4w_o = [4587 \times 138 \times 128]\lambda^3 = 10^{-5}\ \text{cm}^3 \tag{13}$$

where an intermediate $\lambda = 0.5\ \mu m$ has been used to obtain the last result.

IV.2. Full-Adder

Planar implementation of a full-adder is based on the minimal circuits reported by Cuykendall (see R. Cuykendall, "Three-Port Reversible Logic", Appl. Opt. 27, 1772 (1988)). A 1-bit full-adder is a device which adds three binary digits, the arguments $A_i$ and $B_i$ together with the CARRY-IN $C_i$. It outputs the $$SUM = A_i \oplus B_i \oplus C_i \text{ and}$$
$$CARRY = C_{i+1} = A_i B_i + A_i C_i + B_i C_i.$$

Figure 11:
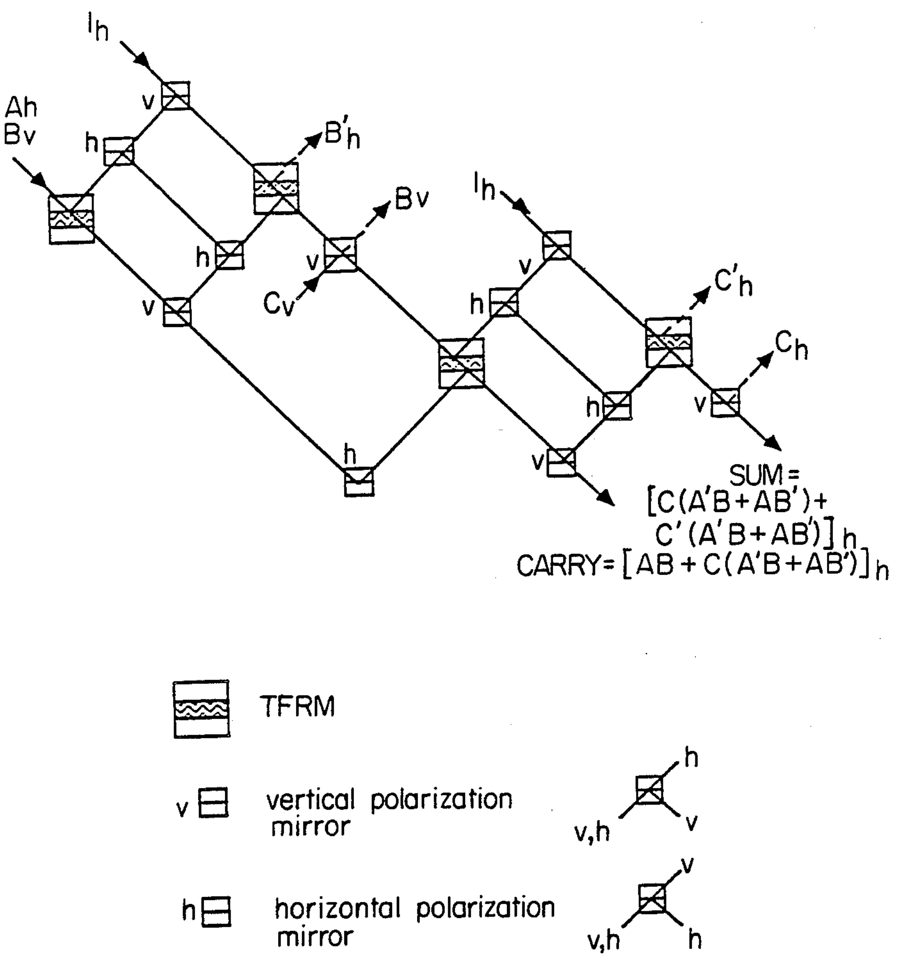
FIG. 11 is a schematic showing a RNI full-adder with v- and h-mirrors.

FIG. 11 shows a schematic diagram of an RNI full-adder circuit where only four nonlinear film gates have been used and the multiplexing is done with v- and h-mirrors. Because of the intrinsic difference of h- and v-polarized beams (only h-polarized beams 'have' a Brewster angle), thin film polarizer performance is far better for v-mirrors, so that for our thin film circuit the h-mirror will have to be replaced with other multiplexing elements. Note that only two half-adders are necessry to build a full-adder. This is possible because, as has already been pointed out, the thin film gate (TFRM) performs also some limited multiplexing function, saving therefore an additinal circuit to OR the carry signals of the two half-adders. The relatively small number of computing primitives (Note that a transistor based full-adder needs on the order of 30–48 transistors [computing primitives].) was only possible because the thin film RNI/Multiplexer has a much more powerful logic than a NAND gate (see FIG. 3).

Figure 12:
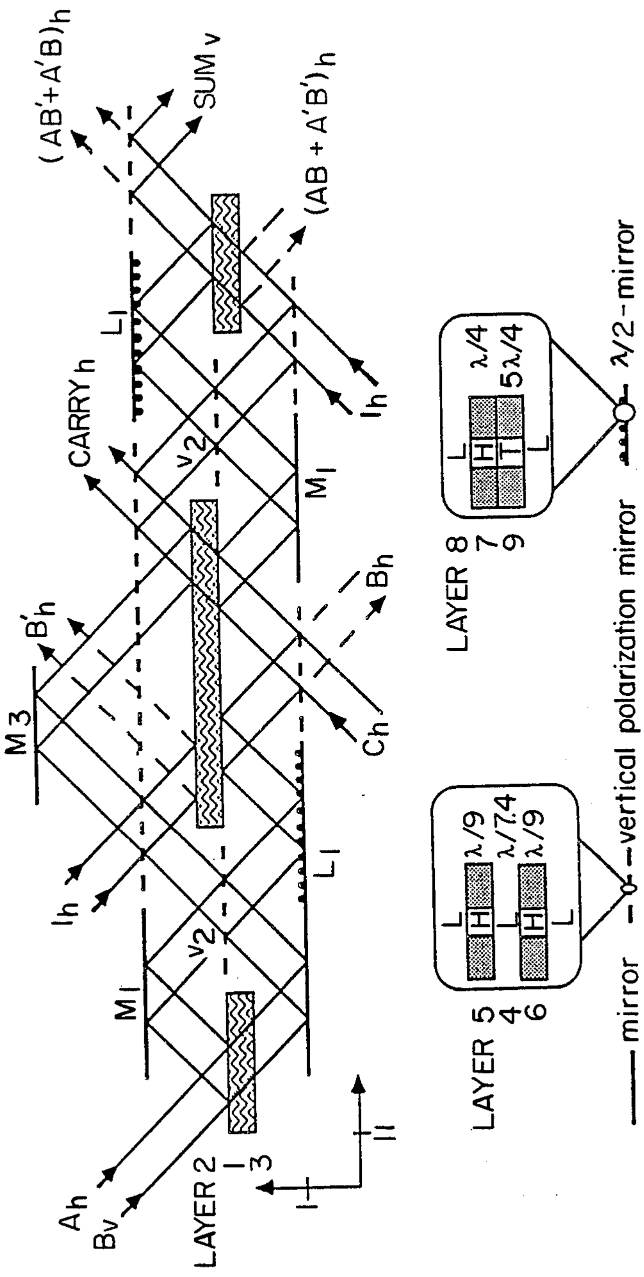
FIG. 12 is a schematic showing a thin film full-adder with layers numbered.

There exist many ways to design a thin film full-adder based on RNI-gates 'wired' together by the multiplexing elements discussed eariler. In FIG. 12 a design is presented which requires the least number of elements. The y-dimension has been blown up by a factor of 11 for improved visualization. Apart from the thickness of the TFRM and the related offsets of the reflected beams, the picture is to scale. Note that the four h-mirrors in FIG. 11 have been replaced by conventional mirrors $M_1$, v-mirrors $V_2$ and $\lambda/2$-mirrors $L_1$.

These substitutions allow reduction of the minimum volume required for the full-adder by more than a factor of two. The mirrors $M_1$, etc. could be simple thin film aluminum or gold coating depending upon the wavelength of light used. The right $\lambda/2$-mirror is optional and can be substituted with a conventional mirror ($M_2$) if it is more convenient for the global circuit. The full-adder version in FIG. 12 outputs therefore a $SUM_h$ and a $B'_v$ instead of a $SUM_v$ and a $B'_h$.

This half-adder design is a slight modification of the half-adder design presented above (see FIG. 9*b*). One of the differences is in the substitution of the mirror $M_2$ by the $\lambda/2$-mirror $L_1$. That modification allows a significantly simplified design of the first half-adder because it allows the second half-adder to be on the same plane as the first one. The other is the substitution of the $V_1$-mirror of the first half-adder with a conventional mirror to redirect the carry so that it leaves the half-adder through the top and can be combined with the carry of the second (upside down) half-adder.

The solid lines in FIG. 12 show the signal beams (channels) which have strictly to do with the full-adder signal processing, while the dashed lines show the additional signal channels which get created by the thin film full-adder. These additional channels, which come from the pump beams necessary for the correct performance of the thin film half-adders, are in effect duplications and inversions of the v-input signals of the individual half-adders, and are characteristic of the proposed circuit architecture based on TFRMs. These extra channels can be of advantage (if needed anyway for a specific circuit), or of disadvantage because any circuit design has to deal with them. One way to get rid of these extra channels would be to use absorptive films to stop them. The disadvantage of this solution is the heating up of the circuits, which in most cases will cause problems. The best way of course would be to combine these extra channels so that they regenerate the pump beams. This would minimize the number of necessary pump beams for a more complex circuit. Unfortunately an elegant way to handle this problem has not yet been found. Work has therefore been restricted to circuit designs which do not require a destruction of these extra signal channels in order to operate correctly. This problem will be even more visible in the next step of integration: the n-bit adder.

The procedure to estimate the theoretical minimum volume requirement for a thin film RNI circuit has been described in section IV.1. It is based on the key idea that for the correct operation of an optical circuit comprised of TFRMs it is necessary that the intensity incident on the individual gates be independent of the path through which the light beams reach the individual gates. This criterion limits the thickness of the focusing, and therefore the minimal size of the circuit.

The longest path between two individual gates in FIG. 12 is $$L_{max}=5(l+5\lambda\tan\theta_o)/\sin\theta_o-5\lambda\tan\theta_o\approx 230w_o+228\lambda \quad (14)$$

which is roughly five times the distance between the two TFRMs which belong to the same half-adder. The incident angle $\theta_o=85°$ has been used to obtain the last results. The minimum beam waist which keeps the beam attenuation due to diffraction below 10% is $w_0\approx 78\lambda$ (see eq. (12)), and from eq. 3 the resulting minimum length of the thin film gate is $l\approx 3619\lambda$. The minimum volume of the thin film full-adder in FIG. 12 is therefore $$\begin{aligned} V_{FA} &= L_{FA}\times H_{FA}\times 4w_o = 6(l+5\lambda\tan\theta_o)\times \\ &(1.5l/\tan\theta_o+7.5\lambda)\times 4w_o = \\ &= [22054\times 492\times 310]\lambda^3 = 4.4\ 10^{-4}\ \text{cm}^3, \end{aligned} \quad (15)$$

where an intermediate $\lambda=0.5$ $\mu$m has been used to obtain the last results. For the height we do not include the $5\lambda$ offset of the mirror which connects the carry signal of the two half-adders or the $1.5\lambda$ for the thickness of the $\lambda/2$-mirror (see section III.3), since they both are negligible on that length scale ($\approx 1\%$).

IV.3. Carry-Propagate Adder

Figure 13:
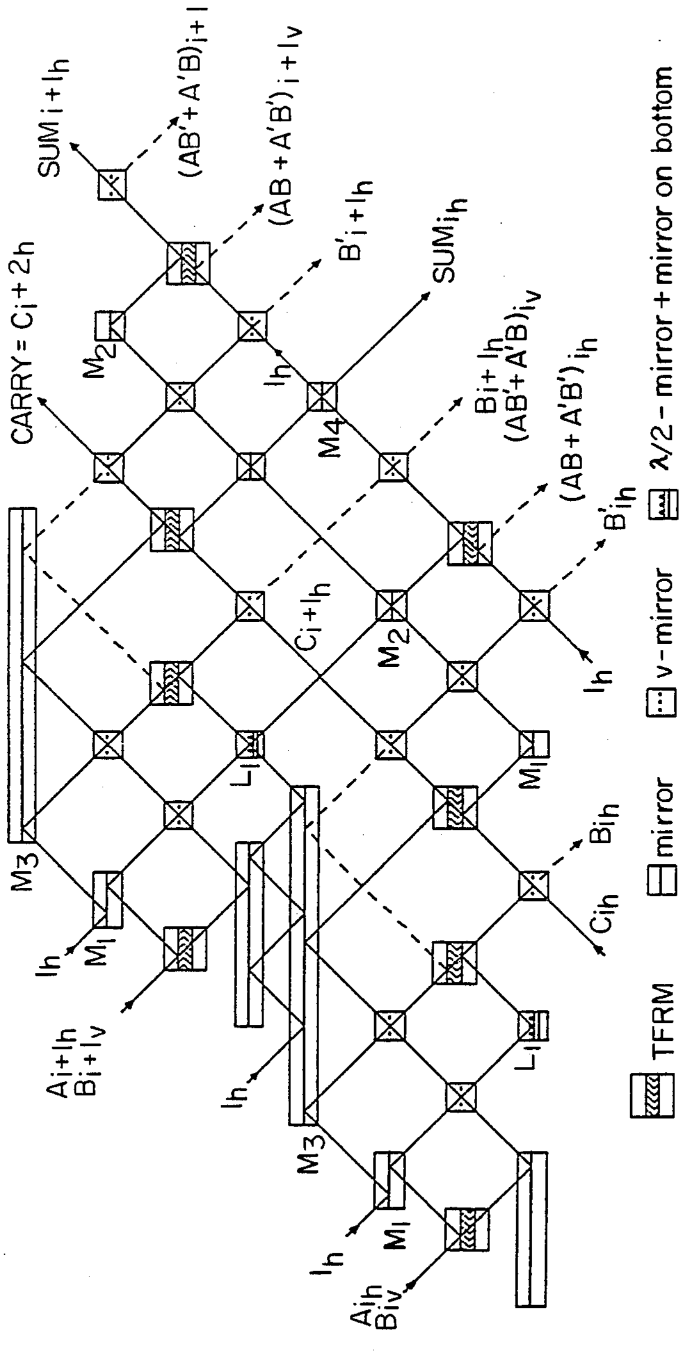
FIG. 13 is a schematic diagram of a RNI carry-propagate adder.
Figure 14:
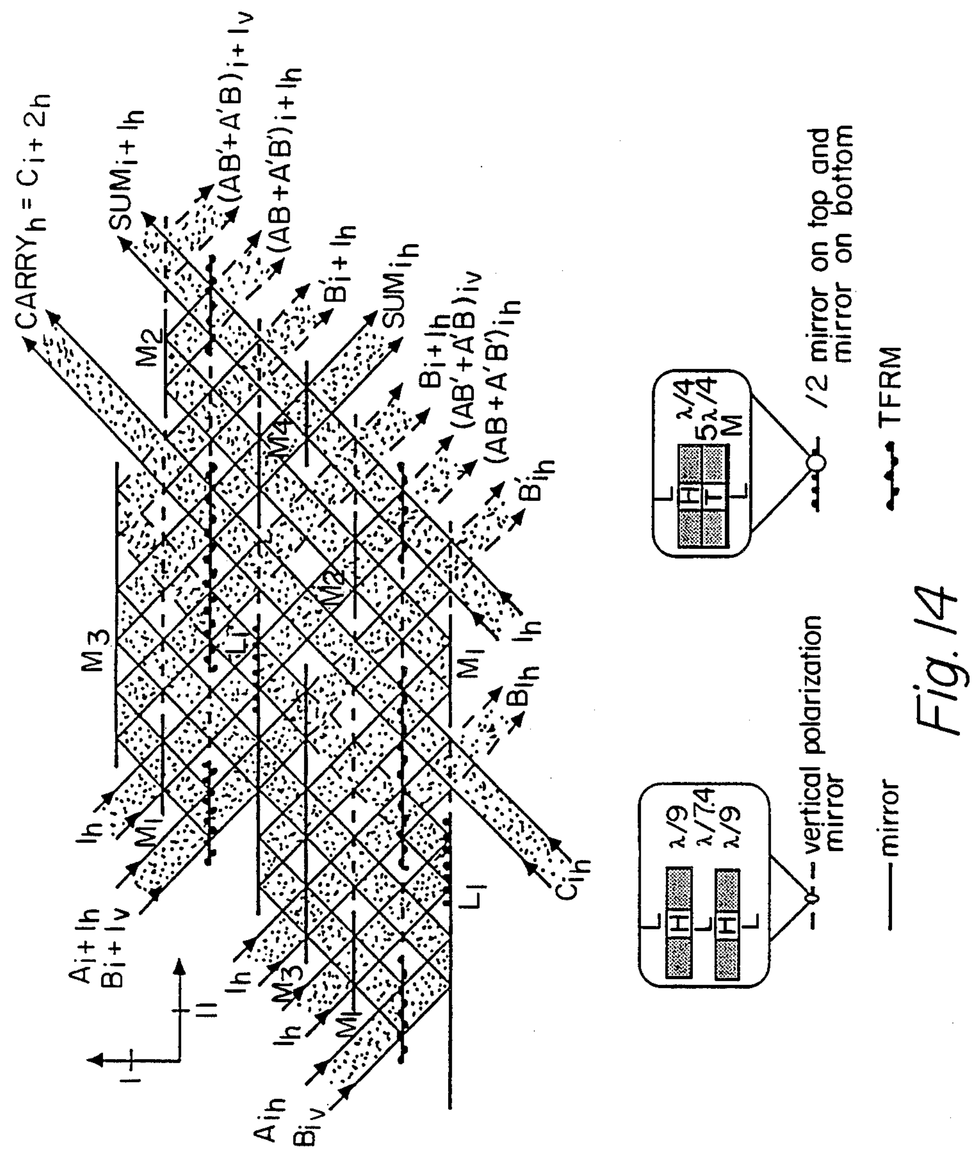
FIG. 14 is a schematic showing a thin film carry-propagate adder.

A carry-propagate adder is an n-bit binary adder where the CARRY signal of each binary adder (full-adder) is an input for the next higher bit full-adder. FIG. 13 shows a schematic diagram of an RNI carry-propagate adder. A thin film version of this n-bit adder is shown in FIG. 14. The same conventions have been chosen as in FIG. 12, the only exception being that the thickness of the TFRM in this picture is also shown to scale. The i-th element of the n-bit adder consists of a slightly modified version of the full-adder presented in the previous section: (1) the first $\lambda/2$-mirror ($L_1$) is coated from the back side so that it operates as a mirror from the bottom side and as a $\lambda/2$-mirror from the top side; (2) the $\lambda/2$-mirror of the second half-adder is substituted with a conventional mirror ($M_2$); (3) the mirror ($M_3$) which allows the OR-ing of the carrys of the two individual half-adders which belong to the same full-adder is extended; and (4) an additional mirror $M_4$ is added. The second modification makes the circuit a little simpler; the third allows the redirectioning of the extra channel $B'_{ih}$ and of the pump beam which pumps the second half-adder of the i+1-st full-adder. The fourth modification further redirects the same pump beam and the output of the i-th bit adder, $SUM_{ih}$, as well.

This design shows clearly the high flexibility of the proposed integration architecture: all elements are used twice, once from the top and once from the bottom side, significantly minimizing the necessary total number of computing and multiplexing elements.

The only signal which connects two adjacent bit adders is the CARRY. Note that the design is made in a way that the $L_{max}$ defined in eq. 14 for the full-adder is also the $L_{max}$ for the n-bit adder, so that the same focusing limit $w_o\approx 78\lambda$ is valid. The horizontal offset of one half-adder to the next lower one is then $$2l+10\lambda\tan\theta_o\approx 853\lambda\approx 0.43\ \text{mm},$$

and the minimum volume requirement for a thin film carry-propagate adder as shown in FIG. 14 is therefore $$V_{CPA}=4/3n.V_{FA}=5.5\ 10^{-4}.n\ cm^{-3} > 1) \quad (16)$$

where again the $\lambda=0.5\ \mu m$ has been used to obtain the last result in both equations.

V. DISCUSSION

One important feature of this thin film architecture is that the layers have no restriction in the third dimension, so that with the same amount of manufacturing steps hundreds of half-adders can be produced. The number is limited only by the film extension in the third dimension and the minimum distance between two adjacent adders necessary to avoid channel interference due to diffraction. The minimum separation is therefore about twice the beam waist. This indicates the high potential that this kind of optical circuit has for parallel calculation. The problem of depositing strips of different materials on the same horizontal plane has to be solved only in one direction, and requires an accuracy of only tens of microns, which is within present state-of-the-art. Ion or laser enhanced chemical vapor deposition, or similar techniques, could be used to produce the desired structure.

Only four materials are necessary to build the thin film half-adders: a nonlinear material (NL), the corresponding linear material (L), another linear material (H) with an index of refraction as high as possible, and a material for the mirrors. The mirrors M could be a simple thin film aluminum or gold coating, depending upon the wavelength of light used. The combination of NL and L forms the nonlinear thin film gate which computes and allows some polarization-independent multiplexing, while the combination of L and H forms the v-mirror for polarization-sensitive wiring (multiplexing). Having the L material in common avoids additional interfaces, and therefore beam splitting, making simpler circuits possible. This integration architecture allows high flexibility in the circuit design since every element can be used at least twice, like the $V_2$-polarizer or the right-hand nonlinear film in FIG. 9*b*. Some circuit elements can also be used from the back side for another computing circuit, minimizing the necessary total number of computing and multiplexing elements.

Note that the volume requirement for the thin film full-adder is roughly 34 times larger than that of the minimum half-adder. The primary reason is the 2.5 times longer $L_{max}$ because of the greater number of gates involved in the circuit. This suggests that if we design a full-adder circuit with $L_{max}\times 31$ allowing more TFRMs the total circuit should still be smaller. Indeed, one can find a design which requires roughly 40% less space. But, if we restrict to the cases which fulfill the reasonable condition that the carry beam should be able to switch a TFRM within the same $L_{max}$ limit, the design becomes very complicated. This is due to the 'echo' channels created by each additional TFRM. By the time one figures out a way to avoid conflicts with the additional channels (dashed lines) and still get the full-adder function, one realizes that the space requirements are roughly equivalent to the much simpler (less elements, less pump beams, less extra channels) design shown in FIG. 12. Therefore the thin film full-adder design presented here is the best one presently known.

Further reduction of a full-adder could be possible only if the beams travel in waveguides from one element to the other, or if soliton pulses can be used. The former could be a transparent polymer (L-material) whose index of refraction has (locally) been permanently changed by a writing UV-beam or another beam which could do the same job. Even if this would significantly complicate the production of the thin film circuits, the possible gain (reduction in size 3–4 orders of magnitude) could make this approach still very attractive. The latter case requires that the L-material be nonlinear and that remains to be discussed in a future paper.

Only five materials are necessary to build the thin film full-adders and the carry-propagate adders: the four materials NL, L, H and M plus the additional total reflectant material (T) necessary for the $\lambda/2$-mirror. The combination of NL and L forms again the thin film gate (TFRM) which computes and allows some polarization-independent multiplexing. The combination of L and H forms the v-mirror and the combination L, H and T forms the $\lambda/2$-mirror which together do the polarization-sensitive wiring (multiplexing). Having the L material in common avoids additional interfaces, and therefore beam splitting, making extremely simple circuits possible.

It has been demonstrated that, at least in principle, the proposed thin film architecture, which is based on the indicated behavior of the non-linear interface, is useful also to make complex optical computing circuits with a very simple design. Further work (experimental and/or theoretical) is necessary in determining the actual switching characteristics of the thin film gate (TFRM) in order to assess beam regeneration and refocusing requirements in real circuits, as well as clock-rate limitations. Since the thin film architectural approach works out so well in the case of half-adder, full-adder and even for n-bit adders, we believe even more that a high potential may exist for extending these ideas to both memory and crossbar designs, thereby allowing thin film optical computing.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

We claim:

1. A modular interaction gate, comprising:

a first material forming a first layer having a computing surface and an opposite multiplexing surface;

a second material forming a second layer and being disposed in intimate contact with said computing surface and forming a computing interface;

a third material forming a third layer and being disposed in intimate contact with said multiplexing surface and forming a multiplexing interface;

means for selectively generating and directing two distinguishable computing beams of approximately equal intensity upon said computing interface such that when said computing beams have a first total intensity said computing beams reflect from said computing interface and when said computing beams have a second total intensity said computing beams pass through said computing interface, through said first layer, and through said multiplexing interface at a point of exit from said first layer;

means for selectively generating and directing two distinguishable multiplexing beams of approximately equal intensity upon said multiplexing interface at said point of exit of said computing beams from said first layer, said multiplexing beams having a total intensity such that said multiplexing beams reflect from said multiplexing interface.

2. The modular interaction gate of claim 1 wherein said computing beams and said multiplexing beams are electromagnetic.

3. The modular interaction gate of claim 2 wherein said electromagnetic beams are light beams.

4. The modular interaction gate of claim 1 wherein said computing beams and said multiplexing beams are of any pulse length and any pulse shape in time and space.

5. The modular interaction gate of claim 1 wherein said computing beams and said multiplexing beams are selected from a group consisting of transverse electromagnetic modes in any combination and superposition.

6. The modular interaction gate of claim 5 wherein said computing beams and said multiplexing beams are selected from a group consisting of Gaussian beams, soliton beams and rectangular beams.

7. The modular interaction gate of claim 1 wherein said computing beams and said multiplexing beams are distinguished by selectively and distinctly polarizing said computing beams and said multiplexing beams.

8. The modular interaction gate of claim 1 wherein said computing beams and said multiplexing beams are distinguished by selectively and distinctly modifying the frequency of said computing beams and said multiplexing beams.

9. The modular interaction gate of claim 1 wherein said computing beams and said multiplexing beams are distinguished by selectively and distinctly pulse coding each of said computing beams and said multiplexing beams.

10. The modular interaction gate of claim 1 wherein said second material and said third material have similar effects on said computing beams and said multiplexing beams.

11. The modular interaction gate of claim 10 wherein said second material and said third material have similar index of refraction behavior.

12. The modular interaction gate of claim 1 wherein said first material is nonlinear.

13. The modular interaction gate of claim 12 wherein said second material and said third material are selected from a group consisting of linear materials, positive nonlinear materials, and negative nonlinear materials and said first total intensity is lower than said second total intensity.

14. The modular interaction gate of claim 13 wherein said first material is positive nonlinear and said second material and said third material are linear and have a higher index of refraction at zero intensity.

15. The modular interaction gate of claim 13 wherein said first material is positive nonlinear and said second material and said third material are negative nonlinear materials and have a higher index of refraction at zero intensity.

16. The modular interaction gate of claim 13 wherein said first material is positive nonlinear and said second material and said third material are slower positive nonlinear materials and have a higher index of refraction at zero intensity as said first material.

17. The modular interaction gate of claim 13 wherein said first material is slower negative nonlinear and said second material and said third material are negative nonlinear materials and have a higher index of refraction at zero intensity as said first material.

18. The modular interaction gate of claim 12 wherein said second material and said third material are selected from a group consisting of linear materials, positive nonlinear materials, and negative nonlinear materials and said first total intensity is higher than said second total intensity.

19. The modular interaction gate of claim 18 wherein said first material is negative nonlinear and said second material and said third material are linear and have a lower index of refraction at zero intensity than said first material.

20. The modular interaction gate of claim 18 wherein said first material is negative nonlinear and said second material and said third material are positive nonlinear materials and have a lower index of refraction at zero intensity than said first material.

21. The modular interaction gate of claim 18 wherein said first material is negative nonlinear and said second material and said third material are slower negative nonlinear materials and have a lower index of refraction at zero intensity as said first material.

22. The modular interaction gate of claim 18 wherein said first material is negative nonlinear and said second material and said third material are slower negative nonlinear materials and have approximately the same index of refraction at zero intensity as said first material.

23. The modular interaction gate of claim 18 wherein said first material is slower positive nonlinear and said second material and said third material are positive nonlinear materials and have a lower index of refraction at zero intensity as said first material.

24. The modular interaction gate of claim 18 wherein said first material is slower positive nonlinear and said second material and said third material are positive nonlinear materials and have approximately the same index of refraction at zero intensity as said first material.

25. The modular interaction gate of claim 1 wherein said second material is nonlinear and said third material is nonlinear.

26. The modular interaction gate of claim 1 wherein said first material is nonlinear, said second material is nonlinear and said third material is nonlinear.

27. A thin film all optical computing circuit comprising:

a modular interaction gate including:

a first material having a nonlinear index of refraction and forming a first layer having a computing surface and an opposite multiplexing surface;

a second material forming a second layer and being disposed in intimate contact with said computing surface and forming a computing interface;

a third material forming a third layer and being disposed in intimate contact with said multiplexing surface and forming a multiplexing interface:

means for selectively generating and directing two distinguishable computing beams of approximately equal intensity upon said computing interface such that when said computing beams have a first total intensity said computing beams reflect from said computing interface and when said computing beams have a second total intensity said computing beams pass through said computing interface, through said first layer, and through said multiplexing interface at a point of exit from said first layer;

means for selectively generating and directing two distinguishable multiplexing beams of approximately equal intensity upon said multiplexing interface at said point of exit of said computing beams from said first layer, said multiplexing beams having a total intensity such that said multiplexing beams reflect from said multiplexing interface;

a polarizer including:

a fourth material forming a fourth layer having opposing surfaces;

a fifth material forming a fifth layer disposed in intimate contact with one of said surfaces of said fourth layer;

a sixth material disposed in intimate contact with the other of said surfaces of said fourth layer;

said fourth, fifth and sixth layers are chosen in layer thickness and refractive index properties such that said computing and said multiplexing beams mostly reflect for one type of polarization and mostly transmit through said layers for the conjugated type of polarization; and a mirror including a reflective material forming a reflective layer;

said modular interaction gate, said polarizer, and said mirror being disposed in adjacent beam communicating layers and forming a multilayered thin film circuit.

28. The thin film circuit of claim 27 wherein said materials are selected from a group of materials consisting of linear, positive nonlinear and negative nonlinear materials.

29. The thin film circuit of claim 28 wherein said fourth, fifth and sixth layers are linear.

30. The thin film circuit of claim 29 wherein said fourth layer is a layered stack of linear materials.

31. The thin film circuit of claim 29 wherein said fifth and sixth layers have approximately the same index of refraction which is higher than the effective refractive index of the fourth layer.

32. The thin film circuit of claim 27 further comprising:

a half-wave reflector including:

a seventh material forming a seventh layer having opposing surfaces;

an eighth material forming an eighth layer disposed in intimate contact with one of said surfaces of said seventh layer;

a ninth material disposed in intimate contact with the other of said surfaces of said seventh layer;

said seventh, eighth and ninth layers are chosen in layer thickness and refractive index properties such that said computing and said multiplexing beams reflect from said layers and change thier polarizations to the conjugate type during total internal reflection;

said modular interaction gate, polarizer, mirror, and half-wave reflector being disposed in adjacent beam communicating layers and forming a multilayer thin film circuit.

33. The thin film circuit of claim 32 wherein said materials are selected from a group of materials consisting of linear, positive nonlinear and negative nonlinear materials.

34. The thin film circuit of claim 33 wherein said seventh, eighth and ninth layers are linear.

35. The thin film circuit of claim 34 wherein said seventh and eighth layers are each layered stacks of linear materials.

36. The thin film circuit of claim 35 wherein the effective refractive index of the eighth layer is less than the refractive index of the ninth layer, which is less than the effective refractive index of the seventh layer.

37. The thin film circuit of claim 32 wherein said second, third and eighth layers are formed from an identical substrate material.

38. The thin film circuit of claim 37 wherein said fourth layer includes said substrate material.

39. The thin film circuit of claim 32 wherein said fifth and sixth layers are formed from identical material.

40. The thin film circuit of claim 39 wherein said seventh layer includes said identical material.

* * * * *